United States Patent [19]

Schilling et al.

[11] 4,183,456

[45] Jan. 15, 1980

[54] METHOD OF FABRICATING LIQUID COOLED GAS TURBINE COMPONENTS

[75] Inventors: William F. Schilling, Schenectady; Adrian M. Beltran, Ballston Lake; Myron C. Muth, Amsterdam, all of N.Y.

[73] Assignee: General Electric Company, Schenectady, N.Y.

[21] Appl. No.: 924,981

[22] Filed: Jul. 17, 1978

Related U.S. Application Data

[63] Continuation-in-part of Ser. No. 785,303, Apr. 6, 1977, abandoned.

[51] Int. Cl.² .............................................. B23K 19/00
[52] U.S. Cl. ................................. 228/175; 228/186; 228/193; 29/156.8 H; 29/157.3 C
[58] Field of Search .............. 29/156.8 H, 156.8 B, 29/157.3 C, 421 R; 228/193, 242, 243, 183, 175, 186; 416/95, 96, 97, 92; 165/168

[56] References Cited

U.S. PATENT DOCUMENTS

| 3,041,040 | 6/1962 | Levinstein | 29/156.8 B |
| 3,773,506 | 11/1973 | Larker | 29/156.8 B |
| 3,928,901 | 12/1975 | Schilling et al. | 29/156.8 B |
| 3,952,939 | 4/1976 | Schilling et al. | 228/193 |
| 4,024,620 | 5/1977 | Torcomian | 29/157.3 C |

FOREIGN PATENT DOCUMENTS

816686 10/1951 Fed. Rep. of Germany ............ 165/168

Primary Examiner—Daniel C. Crane
Attorney, Agent, or Firm—J. C. Squillaro

[57] ABSTRACT

A method of fabricating complex, composite components for water-cooled, high temperature gas turbines is provided. The method utilizes hot isostatic pressure with molten glass as a pressure transmitting medium. Metal tubing and cladding are bonded to a component core under conditions such that the ends of the tubing extend above the molten glass whereby the pressure inside and outside of the tubing is maintained at equilibrium to prevent collapsing thereof during the application of hot isostatic pressure.

20 Claims, 8 Drawing Figures

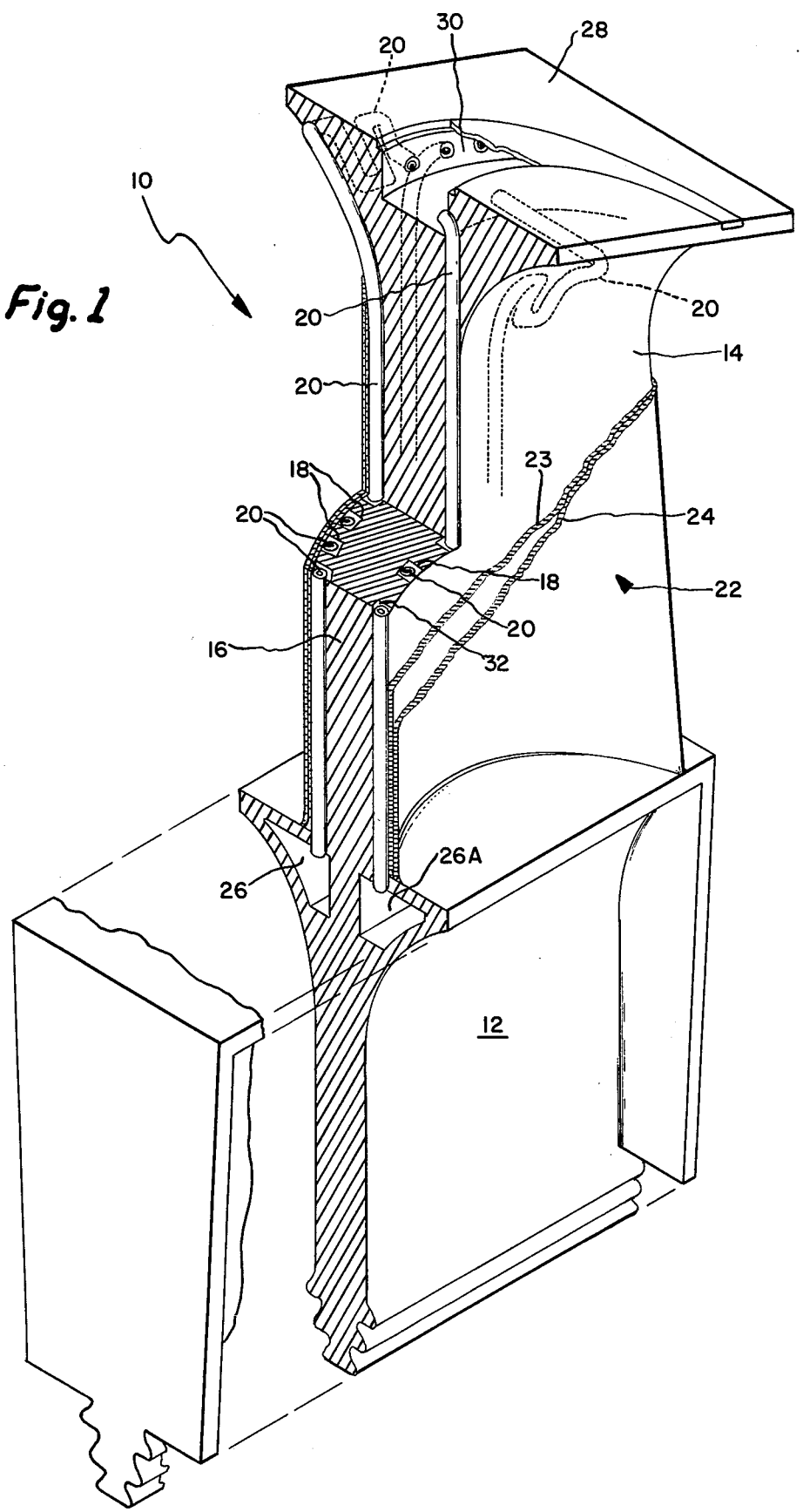

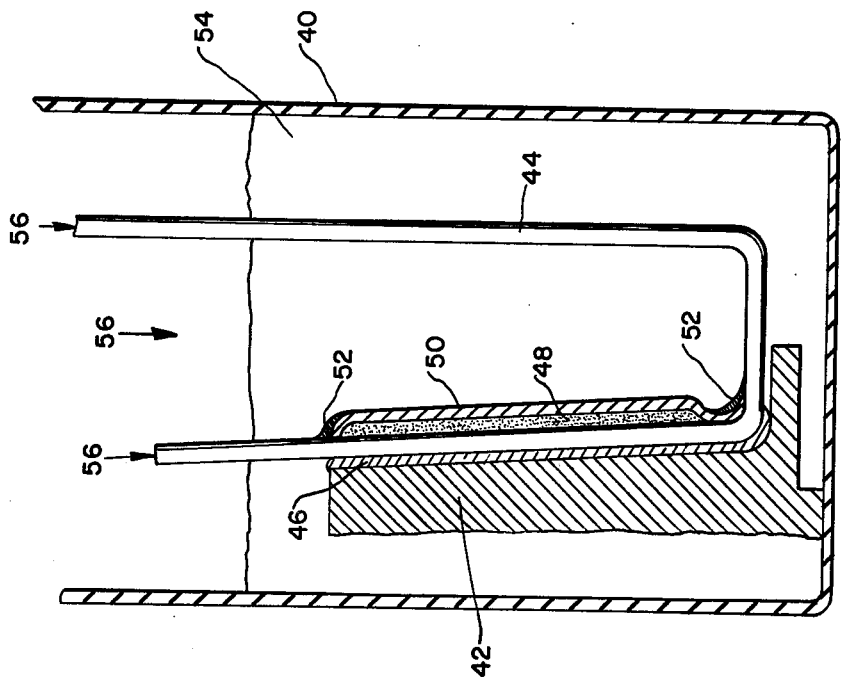
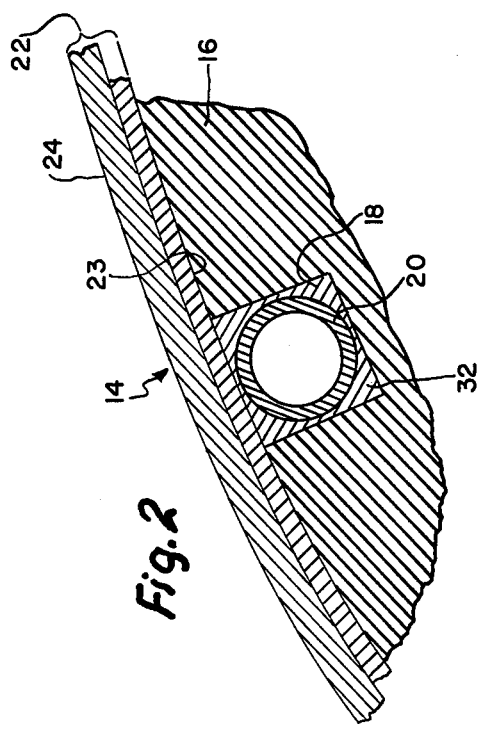

METHOD OF FABRICATING LIQUID COOLED GAS TURBINE COMPONENTS

This application is a continuation-in-part of application Ser. No. 785,303, filed Apr. 6, 1977, now abandoned.

BACKGROUND OF THE INVENTION

Structural arrangements for the open-circuit liquid cooling of gas turbine buckets are shown by Kydd, U.S. Pat. Nos. 3,445,481 and 3,446,482. The first patent discloses a bucket having cooling passages open at both ends which are defined by a series of ribs forming part of the core portion of the bucket and a sheet metal skin covering the core and welded to the ribs. The second patent discloses squirting liquid under pressure into hollow forged or cast turbine buckets. Another patent issued to Kydd, U.S. Pat. No. 3,619,076 described an open circuit cooling system wherein a turbine blade construction consists of a central airfoil-shaped spar which is clad with a sheet of metal having a very high thermal conductivity, e.g. copper. The cladding sheet has grooves recessed in the sheet face adjacent to the spar, which grooves together with the smooth surface of the spar define coolant passages distributed over the surface of the turbine blade. There are numerous disadvantages in forming liquid cooling passages by bonding a sheet to a core in either of the configurations shown in U.S. Pat. Nos. 3,445,481 or 3,619,076. Thus, when a braze is used to bond the skin, some channels of the turbine buckets become plugged and obstructed with braze material. Excellent bonds are required between the core and the skin to contain the water in full channel flow under the extremely high hydraulic pressures which result from the centrifugal forces during operation of the turbine. In addition, any cracks in the skin can cause leakage of the coolant and result in vane failure.

Many of the disadvantages of the prior art are overcome by the invention disclosed in the copending application of Anderson, "Liquid Cooled Gas Turbine Buckets," Ser. No. 749,719, filed Dec. 13, 1976, now U.S. Pat. No. 4,156,582. Anderson discloses water cooled turbine buckets wherein the water-cooling channels are formed using preformed tubes which are located beneath an outer protective layer composed of an inner skin to provide high thermal conductivity and an outer skin to provide protection from hot corrosion.

Schilling, et. al., U.S. Pat. No. 3,928,901 and Schilling, et. al., U.S. Pat. No. 3,952,939 both disclose methods of attaching sheet cladding to a convex-concave substrate such as an airfoil or a turbine bucket using isostatic pressing techniques. However, the procedures set forth in these Schilling patents when applied to the manufacture of turbine buckets incorporating preformed tubes will tend to collapse the tubes. Furthermore, when molten glass is used as the pressure transmitting medium as disclosed in U.S. Pat. No. 3,952,939, the molten glass is able to enter the tubes and is then difficult or almost impossible to remove without damage to the tubes.

SUMMARY OF THE INVENTION

In accordance with our invention, we have discovered a method of making composite components, such as turbine buckets and nozzles, for water-cooled, high temperature gas turbines by preparing a cast article having a plurality of channels therein for vacuum brazing. Thereafter a plurality of preformed metal tubing sections are placed into the channels at a preselected portion of said article in such a manner that both ends of each tubing section extends external to said portion. Subsequently, a sheet cladding is preformed to the shape of the portion and the seams formed between the cladding and the portion are masked. Thereafter, the assembly is placed in a molten glass environment, while maintaining said tubing sections extending above the molten glass and the assembly is subjected to a programmed time-temperature hot isostatic pressure cycle during the diffusion bonding step. Alternatively, only one end of each tubing section extends external to the portion and above the molten glass level, while the other end is sealed off.

BRIEF DESCRIPTION OF THE DRAWING

The invention is more clearly understood from the following description taken in conjunction with the accompanying drawing in which:

FIG. 1 is a perspective view, with portions broken away, of a turbine bucket having preformed cooling tubes diffusion bonded to an airfoil according to the method of the present invention.

FIG. 2 is an enlarged fragmental transverse view of the airfoil of FIG. 1 showing the location of a cooling tube.

FIG. 3 is a cross sectional, schematic representation of a turbine bucket in an apparatus for hot isostatic pressing illustrating the principles of the present invention.

DESCRIPTION OF PREFERRED EMBODIMENT

Figure 4:
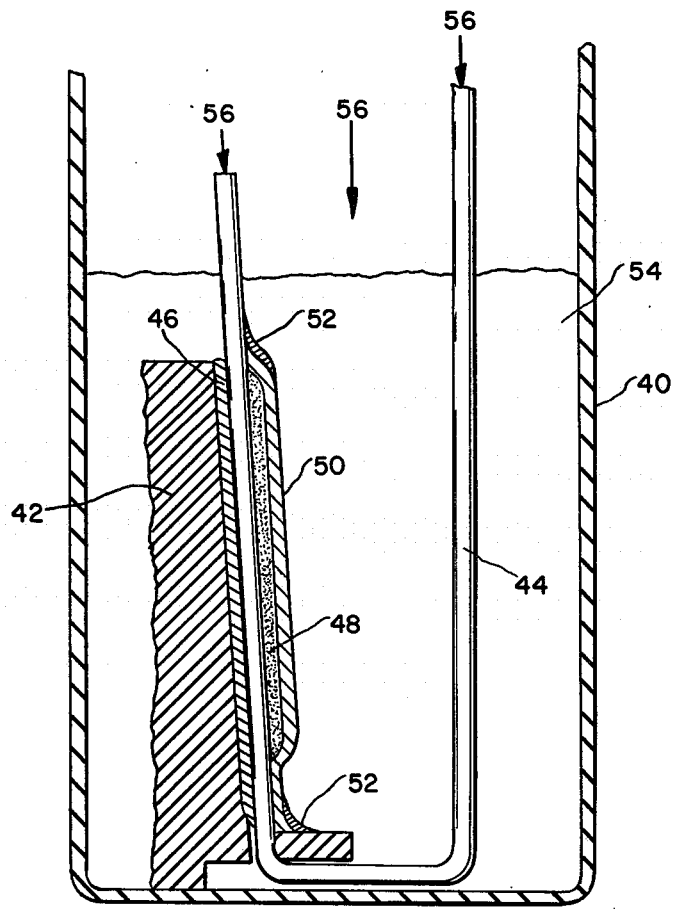
FIG. 4 is another cross section, schematic representation of a variation of the embodiment of FIG. 3.

Referring to FIG. 1, turbine bucket 10 consists of a shank 12 and a water cooled airfoil 14 constructed from a core 16, having a multiplicity of radial grooves 18 either cast or machined into the surface thereof. The number of these grooves 18 depends on the size and the cooling requirements of the bucket 10. Into these grooves 18 are fitted preformed cooling tubes 20 which are bonded to the core 16 such as by brazing and preferably have a portion exposed to and in contact with a composite skin 22 which covers and envelopes the outer surface of the core 16. This composite skin 22 is composed of an inner layer or skin 23 which is highly heat conducting to maintain substantially uniform temperature over the surface of the bucket during operation of the turbine, resulting from exposure with the hot gases on the outside of the bucket and the internal water cooling. The preferred inner skin material is copper or a copper containing material which, however, is not resistant to the corrosive atmosphere of the hot gases present during operation of the gas turbine. Therefore, an outer corrosion resistant skin 24 is required to cover and protect the inner skin 23.

The cooling tubes 20 are shown to communicate root plenums 26 and 26A with a plenum 30 formed in a tip shroud 28. Some of the cooling tubes 20 serpentine back and forth on the radially inner side of the tip shroud 28 before emptying into the tip shroud plenum 30. This cools the shroud and aids in the manufacturing process since the shroud cooling channel is a continuation of the airfoil cooling tubes 20. The core 16 is cast along with the tip shroud 28 and the shank 12 and carries the centrifugal load of the tubes 20, the composite skin 22 and the tip shroud 28.

FIG. 2 shows an enlarged, cross-sectional view of the structure of the airfoil 14 in the proximity of the cooling tube 20. As is shown, the cooling tube 20 is fitted into and bonded to groove 18 within the core 16 of the airfoil 14 by means of braze 32. The composite skin 22, which consists of an inner skin 23 and an outer skin 24, overlays the tube 20 and the core 16.

The method of our invention utilizes hot isostatic pressure in combination with molten glass as a pressure transmitting medium to fabricate the desired component. Initially the cast bucket surface is prepared, for example, by glass sandblasting, chemical etching and possibly nickel plating, followed by a suitable vacuum diffusion heat treatment. The preformed tubing of appropriate size and composition is then vacuum brazed into the cast-in channels in such a manner that both ends of the tubing extend significantly external to the airfoil portion of the bucket.

Thereafter the sheet cladding is formed to the shape of the substrate on a mandrel or master shape as for example by the method disclosed in Schilling, et. al. U.S. Pat. No. 3,928,901 and assigned to the assignee of the present invention and incorporated herein by reference. Briefly described, this method comprises the steps of: rough forming the sheet cladding to the master shape so that the sheet cladding closely abuts the convex surface of the master shape while the sheet cladding opposite the concave surface of the master shape is spaced from the concave surface; placing the sheet cladding and master shape in a sealed rubbery mold; and, applying isostatic pressure to the mold to deform the sheet cladding into contact with the master shape concave surface.

After the formed sheet cladding and substrate with brazed-in tubes are assembled, the assembly is further prepared by masking all seams which are defined between the cladding sheet and substrate to prevent penetration by the pressure transmitting medium into the interface between the cladding and substrate. The masking step may be carried out by taping the seams or by tack welding the cladding sheet to the substrate along the seams. Brazing is another method which could be used during the masking step. All that is required is that some step by taken to keep the pressure transmitting medium, whether it is in the solid, gaseous or molten state, from entering the cladding-substrate interface.

The masked assembly is then inserted into a metal container and filled with glass beads or chips such that upon heating above the melting temperature of the glass, the assembly will be immersed in the molten glass and the upper portion of the tubing will extend about 2-3 inches above the glass level. Glass is preferred as a pressure transmitting medium because the glass will densify and become molten at diffusion bonding temperatures to provide an optimum hydrostatic pressure transmitting medium. Moreover, glass is relatively inert, and can be easily removed from the surface of the assembly upon solidification after the diffusion bonding step.

Figure 6:
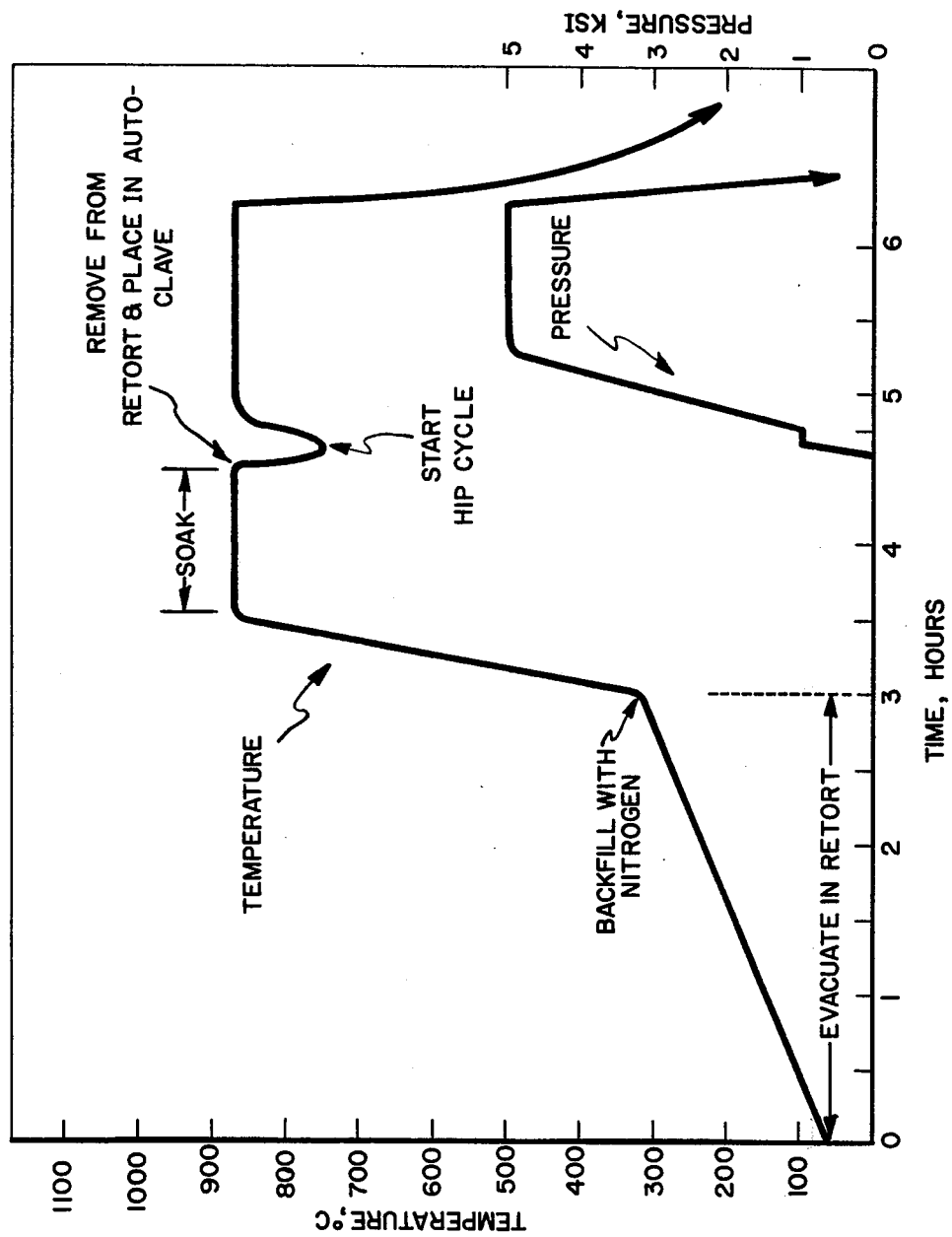
FIG. 6 is a graph showing typical pressure-temperature-time curves for the diffusion bonding step.

The loading container is then placed into a vacuum retort furnace and a dynamic vacuum of about 5 μm Hg is applied. While under vacuum, the temperature of the retort is raised, for example, to about 600° F. (315° C.) in order to outgas the glass and the part. After an appropriate hold time, the retort is backfilled with either argon or nitrogen and the temperature raised to the desired bonding temperature. During this sequence, the glass chips become molten, flow and coat the entire part except the tops of the tubing which extend 2-3 inches above the tip of the part. The loaded container is removed hot from the retort and placed in a hot isostatic press (autoclave) which is set at the desired bonding temperature. The autoclave is sealed and pressure applied. During the bonding step, molten glass is prevented from entering the interfacial areas due to the pressure of the masking material and the tubing does not collapse under the applied pressure because it is open to the autoclave atmosphere. Temperatures and pressures used during the diffusion bonding step are dependent upon the materials which are bonded. FIG. 6 shows a typical time, temperature and pressure curve for a diffusion bonding cycle.

Thereafter, the bonded assembly is removed from the container and glass which has adhered to the surfaces of the assembly is removed by sandblasting or by subsequent vacuum heating and water quenching of the assembly. At this point, the bonded clad-substrate assembly may be subjected to a final heat treatment, if required. Our invention is further illustrated by the following example:

EXAMPLE

A schematic representations of the turbine bucket in the apparatus used herein is shown in FIG. 3.

An IN738B, MS5001 first stage bucket 42 was obtained in the as-cast condition with a completely solid airfoil 42. A channel approximately 0.15 inches wide × 0.15 inches deep was electrodischarge machined over the entire length of the airfoil 42 on the pressure (concave) face. After machining, the entire airfoil 42 was cleaned by glass bead blasting and degreased.

After cleaning, a 12" length of OFHC copper tubing 44 (⅛" O.D.×0.090" I.D.) bent in a "U" shape as placed in the airfoil channel as shown and above the platform 43 in a manner such that both ends of the tubing extended about 3 inches above the tip of the airfoil. The tubing 44 was held in place by strips of Nichrome sheet which were spot welded to the airfoil. The copper tubing was brazed into the airfoil with a brazing alloy 46, "Nicrobraze 10," at about 1700° F. (927° C.). Subsequent to brazing, the excess braze alloy was removed by grinding.

A 2"×3" sheet of 0.015" thick annealed OFHC copper 48 was placed over a section of the brazed-in tubing and hand formed over it to match the concave radius of the airfoil 42. After forming, the copper sheet was cleaned by etching in dilute nitric acid. A sheet 50 of Hastelloy X approximately 2½×3½" by 0.007" thick which had been cleaned by abrading and degreased was placed over the copper sheet 48 such that a ¼" overlap resulted on all sides. The Hastelloy X sheet 50 was spot welded directly to the airfoil surface and the edges covered by masking 52.

The entire assembly was placed in a stainless steel can 40 and soda-lime glass chips were added to a level which would cover the airfoil but not the tops of the tubing 44, when during heating the chips become transformed to a molten glass 54. The can 40 with contents was placed in a retort and evacuated to a dynamic vacuum of about 5 μm Hg for about 3 hours. During this period the temperature of the retort was raised to about 600° F. (315° C.) in order to facilitate the outgassing cycle. After the hold period, the retort was backfilled with argon gas 56 to atmospheric pressure and the temperature raised to 1600° F. at which temperature the can assembly was allowed to soak for one hour.

After the additional one hour hold, the can 40 was removed from the retort and placed in a hot isostatic press (autoclave) which was idling at 1600° F. (871° C.). The autoclave was then sealed and pressurized to 5,000 psi and held at temperature and pressure for one hour. After bonding the autoclave was depressurized and the parts removed at 1600° F. (871° C.). The diffusion bonding was performed in accordance with the pressure-temperature-time curve shown in FIG. 6.

Excess glass was removed from the airfoil section of the bucket 42 by sandblasting. A transverse section of the airfoil was mounted and metallographically prepared. It was observed that the copper tubing 44 remained open and had not collapsed. This may be explained by the fact that its internal pressure was at equilibrium with the applied autoclave pressure. At 5,000 psi and 1600° F. (871° C.) the copper tubing 44 was actually extruded into a void in the area filled with braze alloy 46. Excellent bondline quality was obtained for the Hastelloy X/Cu and Cu/IN738B interfaces.

It is apparent that the configuration shown in FIG. 3 and used in the example, wherein "U" tube exits above the bucket platform, does not result in a bucket having tubes located as shown in FIG. 1. It will be appreciated, however, that the desired configuration can be achieved by simply drilling holes of appropriate diameter and location in the platform 43 and passing the pressurized tube through the hole and brazing it in place. This is shown schematically in FIG. 4, wherein like parts are designated by the same numerals as those of FIG. 3. The unwanted sections of the tube would then be machined away after the bonding cycle.

Figure 5:
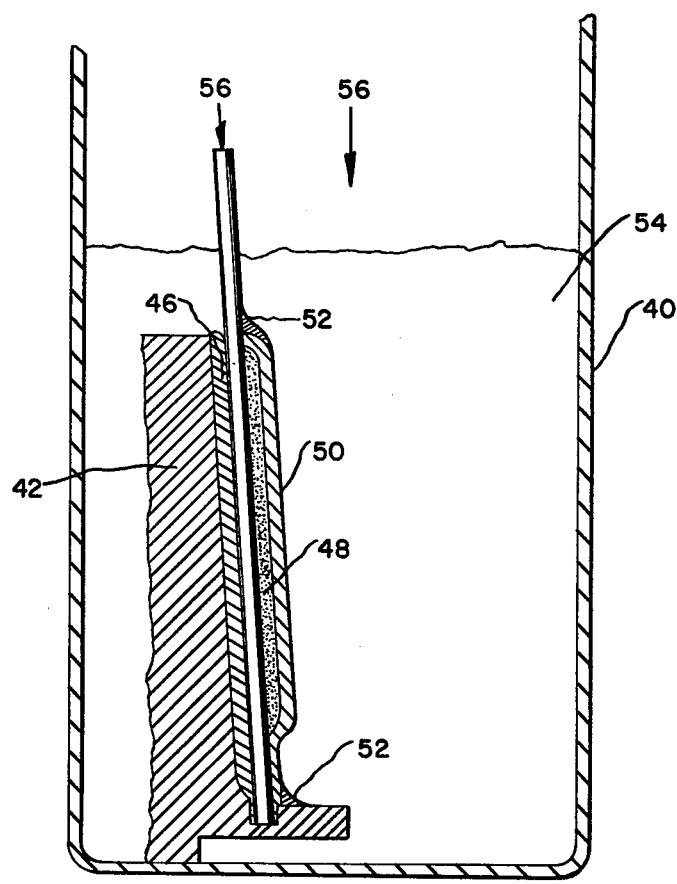
FIG. 5 is yet another cross sectional, schematic representation of a variation of the embodiment of FIG. 3.

Similarly, FIG. 5, wherein like parts are designated by the same numerals as those of FIG. 3, illustrates another modification. Thus, the pressurized tube could be brazed in a prelocated, drilled hole which does not completely penetrate the cross-section of the platform 43, and then bonding the cladding. Final drilling of the hole to the desired size may then be accomplished from the dovetail side of the platform.

Figure 7:
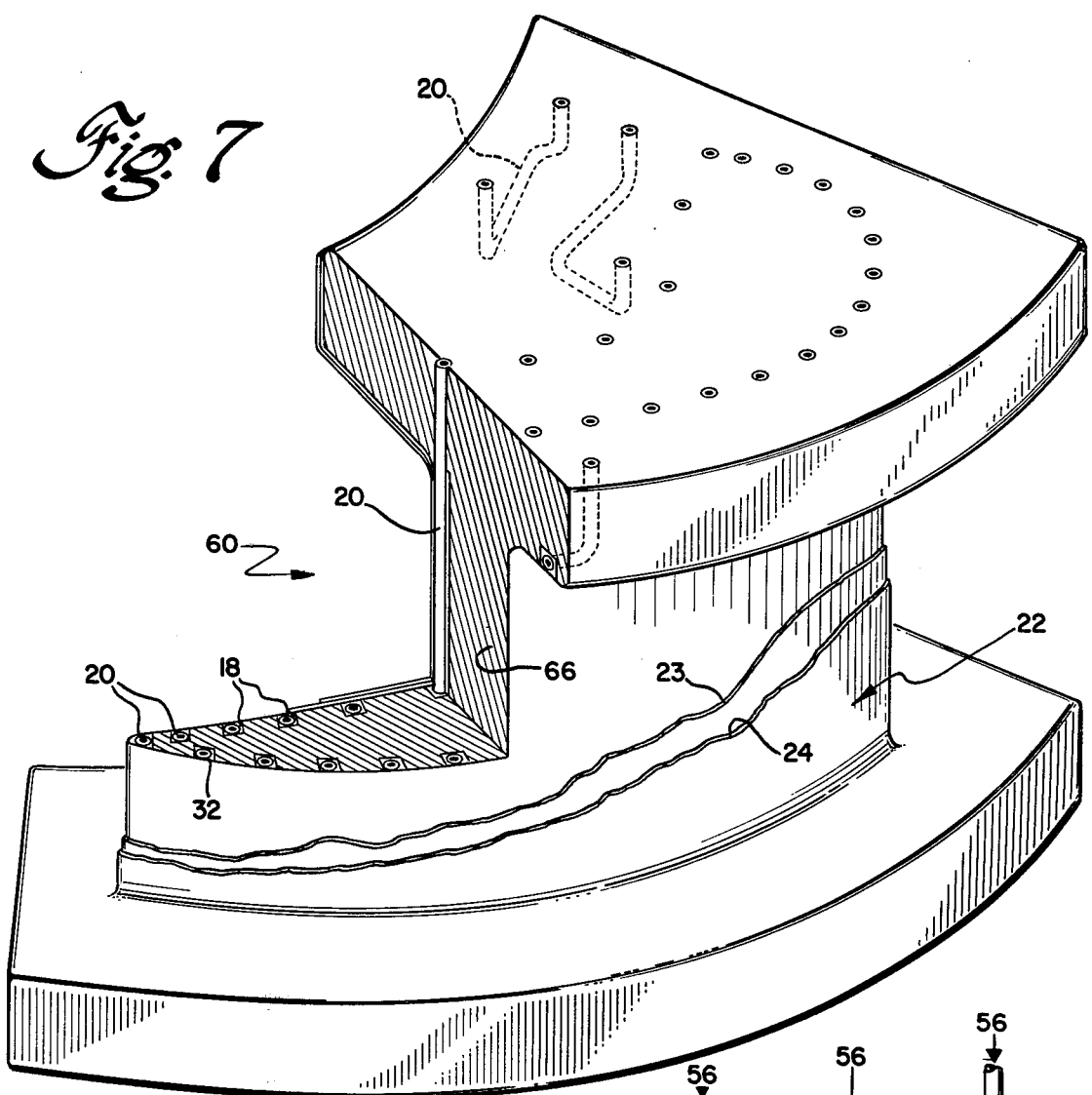
FIG. 7 is a perspective view, with portions broken away, of a turbine nozzle having performed tubing diffusion bonded to a core according to the method of the present invention.

A further embodiment of the invention is illustrated in FIG. 7, which shows a turbine nozzle 60 made by the same process and having similar structural elements as those depicted in the turbine bucket 10 of FIG. 1. The core 66 of the nozzle 60 has a multiplicity of radial grooves 18 either cast or machined into the surface thereof. Into these grooves 18 are fitted preformed cooling tubes 20 which are bonded to the core 66 by means of a braze 32 applied by a standard brazing technique. The composite skin 22, preferrably in contact with a portion of the cooling tubes 20, is composed of the inner layer 23 which is highly heat conducting, such as copper or a copper containing material, and the outer corrosion resistant skin 24. An enlarged cross-sectional view of the structure of the nozzle 60 in the proximity of the cooling tube is similar to the structure shown in FIG. 2.

Figure 8:
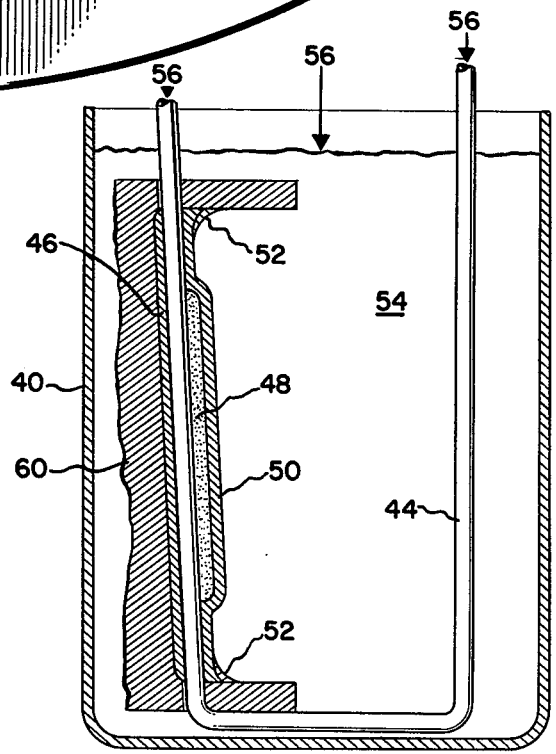
FIG. 8 is a cross sectional, schematic representation of a turbine nozzle in an apparatus for hot isostatic pressing similar to that shown in FIG. 3.

A schematic representation of the turbine nozzle 60 in an apparatus used in this invention is shown in FIG. 8 which is almost identical to the representation shown in FIG. 3 for the turbine bucket. Thus for the nozzle the copper tubing 44 bent in a "U" shape is placed in nozzle channels as shown in such a manner that both ends of the tubing 44 extends about 3 inches above the nozzle. The tubing was held in place with Nichrome strips which were spot welded to the nozzle. The copper tubing 44 was brazed into the nozzle 60 with a brazing alloy 46. Thereafter a 0.015" thick copper sheet was placed over a section of the brazed-in tubing and conformed to the shape of the nozzle to form the inner layer 48. A Hastelloy X sheet 50 was spot welded directly to the surface of the nozzle 60 and the edges covered by masking 52.

The entire assembly was placed in a stainless steel can 40 and soda-lime glass chips were added to a level which during heating would cover the nozzle 60, but below the tops of the tubing 44 when the chips become transformed to a molten glass 54. The diffusion bonding including the presence of argon gas 56 and is performed according to the pressure-temperature-time curve shown in FIG. 6.

It will be appreciated that the invention is not limited to the specific details shown in the examples and illustrations and that various modifications may be made within the ordinary skill in the art without departing from the spirit and scope of the invention.

We claim:
1. A method of making a water-cooled, high temperature turbine bucket comprising the steps of:
   (a) disposing a plurality of metal tubing sections on a preselected interface portion of a gas turbine bucket in such a manner that at least one end of each tubing section extends external to the airfoil portion of the bucket,
   (b) placing a preformed cladding over both the airfoil portion and the tubing whereby the said extending tube ends also project beyond the cladding and affixing the cladding to said airfoil portion to form an assembly,
   (c) masking exposed portions of the interface between the cladding and the airfoil portions,
   (d) subjecting the assembly to hot isostatic pressure in a pressure transmitting liquid at a sufficient temperature and pressure, while maintaining said tubing sections open to said pressure such that the same pressure exist inside and outside of said sections preventing said section from collapsing, and whereby the tubing and the cladding are metallurgically bonded to the turbine bucket.
2. The method of claim 1, wherein both ends of each tubing section extend external to the airfoil.
3. The method of claim 2, wherein the tubing sections pass through a platform of the turbine bucket.
4. The method of claim 1, wherein only one end of said tubing section extends external to the airfoil and the other end is closed.
5. The method of claim 4, wherein said closed tube end is embedded in a platform of the turbine bucket.
6. A method of making a water-cooled, high temperature turbine bucket comprising the steps of:
   (a) preparing for vacuum brazing a gas turbine bucket having a plurality of channels formed therein,

(b) disposing a plurality of metal tubing sections into said channels in such a manner that both ends of each tubing section extend external to the airfoil portion of the bucket, and vacuum brazing said sections in said channels, (c) placing a preformed cladding over the airfoil portion including the tubing disposed in channels formed therein and whereby the ends of said tubing extend beyond the cladding and affixing the cladding to said airfoil portion to form an assembly, (d) masking exposed portions of the interface between the cladding and the airfoil portion of the bucket, (e) subjecting the assembly to hot isostatic pressure in a pressure transmitting liquid at a sufficient temperature and pressure, while maintaining said tubing sections extending above said liquid such that the same pressure exists inside and outside of said sections preventing said section from collapsing, and whereby the tubing and the cladding are bonded to the turbine bucket.

7. The method of claim 6, wherein said liquid is molten glass.

8. The method of claim 7, wherein said glass is soda-lime glass.

9. The method according to claim 7, wherein the diffusion bonding step is performed according to the time-temperature-pressure schedule as set forth in FIG. 6.

10. The method of claim 7, wherein said cladding is a composite layer consisting of an inner skin in contact with said tubing to provide high thermal conductivity and an outer skin to provide hot corrosion resistance.

11. The method of claim 10, wherein said tubing is copper and said inner skin is a member selected from the group consisting of copper and oxide dispersion strengthened copper and said outer skin is a nickel-base alloy.

12. A method of making an article of manufacture comprising the steps of:

(a) disposing a plurality of metal tubing sections at a preselected interface portion of said article in such a manner that at least one end of each tubing section extends external to said portion, (b) placing a preformed cladding over both said portion and the tubing whereby the said extending tube ends also project beyond the cladding and affixing the cladding to said portion to form an assembly, (c) masking exposed interfaces between the cladding and said portion, (d) subjecting the assembly to hot isostatic pressure in a pressure transmitting liquid at a sufficient temperature and pressure, while maintaining said tubing sections open to said pressure such that the same pressure exist inside and outside of said sections preventing said section from collapsing, and whereby the tubing and the cladding are metallurgically bonded to the article.

13. The method of claim 12, wherein both ends of each tubing section extend external to said portion.

14. The method of claim 12, wherein only one end of said tubing section extends external to said portion and the other end is closed.

15. A method of making a water-cooled, high temperature turbine nozzle comprising the steps of:

(a) preparing for vacuum brazing a gas turbine nozzle having a plurality of channels formed therein, (b) disposing a plurality of metal tubing sections into said channels in such a manner that both ends of each tubing section extend external to a portion of said nozzle, and vacuum brazing said sections in said channels, (c) placing a preformed cladding over said portion including the tubing disposed in channels formed therein and whereby the ends of said tubing extend beyond the cladding to said portion to form an assembly, (d) masking exposed interfaces between the cladding and said portion, (e) subjecting the assembly to hot isostatic pressure in a pressure transmitting liquid at a sufficient temperature and pressure, while maintaining said tubing sections extending above said liquid such that the same pressure exist inside and outside of said sections preventing said section from collapsing, and whereby the tubing and the cladding are bonded to the turbine nozzle.

16. The method of claim 15, wherein said liquid is molten glass.

17. The method of claim 16, wherein said glass is soda-lime glass.

18. The method according to claim 16, wherein the diffusion bonding step is performed according to the time-temperature pressure schedule as set forth in FIG. 6.

19. The method of claim 16, wherein said cladding is a composite layer consisting of an inner skin in contact with said tubing to provide high thermal conductivity and an outer skin to provide hot corrosion resistance.

20. The method of claim 19, wherein said tubing is copper and said inner skin is a member selected from the group consisting of copper and oxide dispersion strengthened copper and said outer skin is a nickel-base alloy.

* * * * *